United States Patent [19]
Anderson

[11] 3,994,186
[45] Nov. 30, 1976

[54] GEAR TRAIN SPEED CHANGING TRANSMISSION

[75] Inventor: J. Edward C. Anderson, Moreland Hills, Ohio

[73] Assignee: Marquette Metal Products Company, Cleveland, Ohio

[22] Filed: May 9, 1975

[21] Appl. No.: 576,001

[52] U.S. Cl. .................................. 74/777; 74/799; 188/77 W
[51] Int. Cl.² ..................... F16H 3/44; F16H 57/10; F16D 51/00
[58] Field of Search ................ 74/750 R, 773, 776, 74/777, 780, 799; 188/77 W

[56] References Cited
UNITED STATES PATENTS

| | | | |
|---|---|---|---|
| 6,755 | 10/1849 | Chapin | 74/777 |
| 1,968,810 | 8/1934 | Dixon | 188/77 W |
| 2,388,699 | 11/1945 | Morrill | 188/77 W |
| 2,886,985 | 5/1959 | Meyer | 74/780 |
| 2,953,944 | 9/1960 | Sundt | 74/750 |

FOREIGN PATENTS OR APPLICATIONS

| | | | |
|---|---|---|---|
| 346,072 | 11/1904 | France | 74/777 |
| 435,116 | 12/1911 | France | 74/750 R |

Primary Examiner—John J. Vrablik
Attorney, Agent, or Firm—Arthur Frederick; Victor D. Behn

[57] ABSTRACT

The gear train speed changing transmission for transmitting rotation from an input member to an output member comprises planet gears carried at the distal end portion of the input member for planetary rotation and connected together for conjoined rotation about their respective axes, at least one of the planet gears being in mesh with a reaction gear and at least one planet gear being in mesh with a gear carried by the output member. The transmission also includes a coil spring brake means disposed to coact with the reaction gear to selectively prevent or permit rotation of the gear.

In a more limited aspect of the invention the transmission has two or more gear trains interconnecting the input member with the output member and wherein each train includes a reaction gear and a brake means for selecting which gear train rotary transmission is to be effected.

12 Claims, 2 Drawing Figures

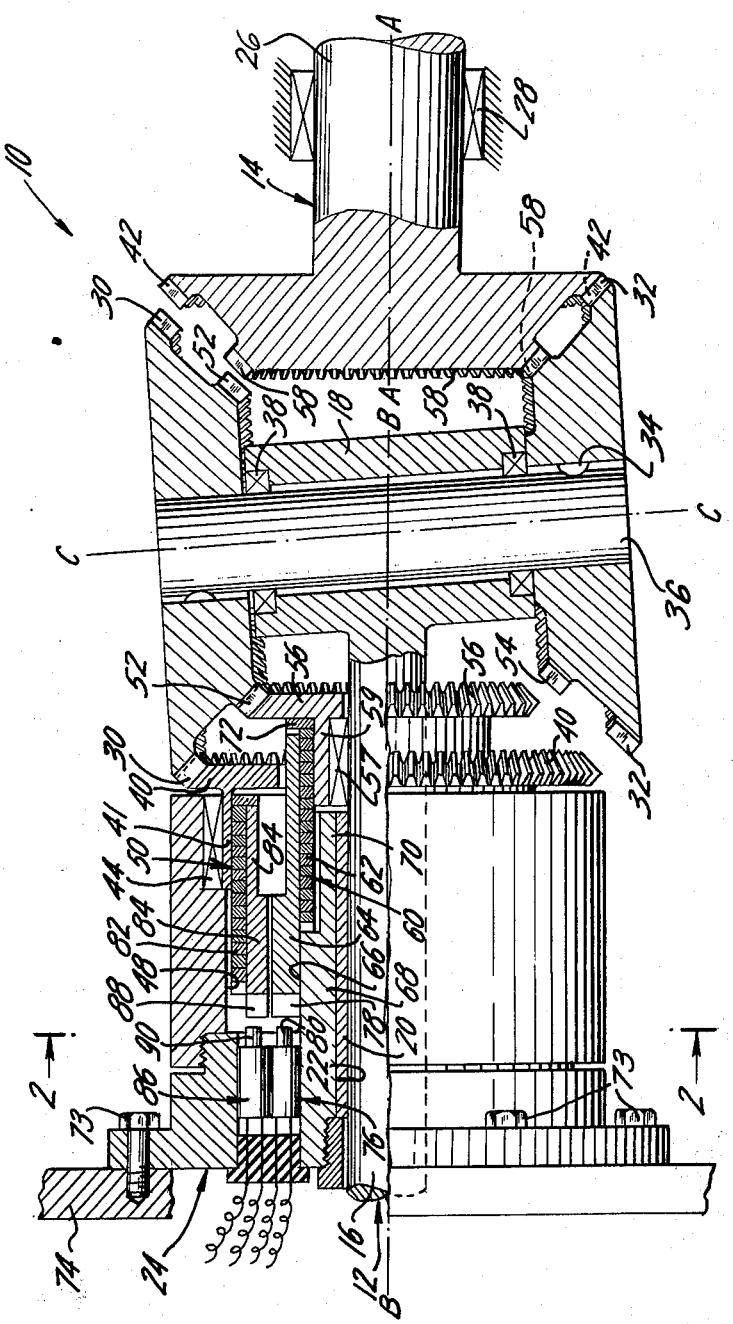

GEAR TRAIN SPEED CHANGING TRANSMISSION

This invention relates to transmissions and, more particularly, to speed changing mechanisms for transmitting rotation from an input member to an output member, such as speed reducers and speed increasers.

BACKGROUND OF THE INVENTION

Conventional speed reducers of high reduction ratios are relatively complex assemblies of large size. Those speed reduction assemblies of the two speed type reqire synchronizer devices to effect switching from one gear train to another without damage to the assembly. In such assemblies, switching or changing from one speed condition to another is accomplished relatively slowly. The present invention therefore seeks to eliminate the aforementioned and other disadvantages of existing speed reducers.

Accordingly, one object of this invention is to provide a speed changing transmission mechanism which is of relatively simple construction and small in size yet capable of providing speed change ratios of high values.

Another object of the present invention is to provide a speed changing transmission mechanism capable of effecting speed change rapidly and without the need for synchronizing elements.

SUMMARY

In view of the foregoing, the present invention contemplates a gear train speed changing transmission mechanism for transmittal of rotation between an input member and an output member, which transmission mechanism may be of the epicyclic, helical or spur gear type having planet gear means carried at the distal end portion of an input member, the planet gear means including at least two gears connected together for conjoined rotation about their respective axes. A reaction gear means and an output gear means are disposed to coact with the planet gear means. One of the two planet gears is disposed to mesh with a gear of the reaction gear means while the other planet gear is in mesh with a gear of the output gear means. A brake means, such as the coil spring type, coacts with the reaction gear means to selectively prevent rotation and permit rotation of the reaction gears of the reaction gear means.

In a narrower aspect of the present invention, the planet gear means includes a shaft supported by the input member in nonright angular relationship to the axis of rotation of the input member and with a planet gear connected to each of the opposite end portions of the shaft.

In a still narrower aspect of this invention, the transmission mechanism has a first and second parallel gear train each of which comprises a set of planet gears, a reaction gear, an output gear and a brake means operable selectively for holding the reaction gear against rotation and releasing the reaction gear for rotation. The gear train having its reaction gear held against rotation is the gear train through which rotation is transmitted from the input member to the output member.

It is to be understood that, while the invention will be herein described as a speed reducer to effect a reduction in the angular velocity of the output member relative to that of the input member which is driven by a source of rotary power, the invention has equal application or utility as a speed increaser since the transmission mechanism can be converted from a speed reducer to a speed increaser merely by connecting the source of rotary power to the output member and thereby effecting reversal of rotary transmission through the mechanism.

BRIEF DESCRIPTION OF THE DRAWING

The invention will be more fully understood from the following description when considered in connection with the accompanying drawing in which:

FIG. 1 is a somewhat schematic view in cross-section of the transmission mechanism of this invention; and FIG. 2 is a cross-sectional view taken substantially along line 2—2 of FIG. 1.

DESCRIPTION OF THE PREFERRED EMBODIMENT

Now referring to the drawings, the reference number 10 refers generally to the gear train speed changing transmission mechanism according to this invention which will be described to effect a reduction in angular speed between an input member 12 and an output member 14. The speed changing mechanism 10 may include an epicyclic gear train or employ a spur or helical gear trains without departing from the scope and spirit of this invention.

The input member 12 comprises an input shaft 16 having an enlarged distal end portion 18. The input shaft 16 is journaled for rotation in a sleeve 20 which is disposed in a bore 22 of a support member 24. The input member 12 is connected to a source of rotary power (not shown) such as an electric motor, fluid motor or other suitable mechanism or engine.

The output member 14 is an output shaft 26 which is suitably journaled for rotation in a bearing 28 and disposed adjacent input member 12 with its longitudinal axis A—A substantially coextensive with the longitudinal axis B—B of input member 12. The output member 14 is connected to rotate a load (not shown) such as a windshield wiper. To transmit rotary motion from input member 12 to output member 14 at two different speed reductions, two parallel gear trains are provided. Although the speed changing mechanism 10 will be described as comprising two parallel gear trains so as to provide two speed reductions, it is to be understood that it is within the scope and spirit of this invention to provide a mechanism 10 having one or more than two parallel gear trains so as to effect a single speed change or more than two speed changes.

As shown in FIG. 1, one gear train comprises two planet gears 30 and 32 each of which is suitably secured as by a key 34 to the end portion of a stub shaft 36. The stub shaft 36 is supported for rotation about its axis in bearings 38 mounted in enlarged end portion 18 of input shaft 16. The stub shaft 36 is supported in enlarged portion 18 so that its longitudinal axis C—C is in non-right angular relation to axes A—A and B—B. This canted relationship of axis C—C to axes A—A and B—B results in planet gear 30 being in meshing relationship with a reaction gear 40 and planet gear 32 being out of mesh with reaction gear 40 and in meshing relationship with an output gear 42. The reaction gear 40 is supported for rotation at its tubular hub portion 41 by a bearing 44 which is mounted in counterbored portion of an annular bore 48 in support member 24. The output gear 42 is suitably connected to output shaft 26 of output member 14 to effect rotation of the output shaft 26. To cause planet gear 40 to "walk" or planetate around reaction gear 40, a suitable brake mechanism 50 is provided to hold reaction gear 40 against rotation. The ratio of the sizes of reaction gear 40, planet gears 30 and 32, and output gear 42 are such that a speed reduction in the order of 200:1 is effected in accordance with formula for the ratio of the gear train:

$$\frac{output}{input} = 1 - \frac{D}{d} \times \frac{D^1}{d^1};$$

wherein
D is the diameter of reaction gear 40
d is the diameter of planet gear 30
$D^1$ is the diameter of planet gear 32
$d^1$ is the diameter of output gear 42

Assuming values for the reaction gear 40 of 13, planet gear 30 of 14, planet gear 32 of 15 and output gear 42 of 14, the ratio as computed from the formula $$\left(1 - \frac{D}{d} \times \frac{D^1}{d^1}\right)$$

is as follows:

$$1 - \frac{13}{14} \times \frac{15}{14} = 1 - \frac{195}{196} = \frac{1}{196}$$

Thus for every 196 revolutions of input shaft 16 there is only one revolution of output shaft 26.

The other gear train comprises a similar but smaller set of gears than the gear train already described herein. This other gear train has two planet gears 52 and 54, which are shown as formed on the same gear blank as gears 30 and 32 but which may be separate gears from gears 30 and 32 keyed to the stub shaft 36 without departure from the scope and spirit of this invention. The planet gear 52 is disposed in mesh with a reaction gear 56 which is similar to reaction gear 40, while planet gear 54 is positioned in meshing relationship with an output gear 58. The reaction gear 56 is supported for rotation by a bearing 57 disposed between the hub portion 59 of the reaction gear and input shaft 16. The output gear 58 is shown as formed on the same blank as output gear 42 but, obviously, may be a gear separate from output gear 42 which is suitably secured to output gear 52 of output shaft 26. Similar to reaction gear 40, reaction gear 56 also coacts with a suitable brake mechanism 60 so as to be held against rotation and thereby cause, when reaction gear 40 is free to rotate, planet gear 52 to "walk" or planetate relative to reaction gear 56. The planet gears 52 and 54, reaction gear 56 and output gear 58 are so sized that in accordance with the formula previously discussed this other gear train effects a speed reduction of a lesser magnitude than the first discussed gear train, as for example 1:100 as compared to 1:196.

The brake mechanism 60 may be of the wrap-spring type comprising, as shown, a coil spring 62 and a control sleeve 64. The control sleeve 64 is supported for rotation on an annular surface 66 of a central portion 68 of support member 24. The central portion 68 has a reduced diameter end portion 70 adjacent hub portion 59 of reaction gear 56. The coil spring 62 is disposed between the inner peripheral surface of control sleeve 64 and the outer peripheral surfaces of reduced diameter end portion 70 and hub portion 59. The spring 62 has a toe end portion 72 which extends into a slot in the end of control sleeve 64. One set of coils of spring 62 is in interference fit with the outer peripheral surface of hub portion 59 of reaction gear 56 while a second set of coils are in non-interference fit with the peripheral surface of reduced end portion 70 of support member 24. The direction of the coil wrappings or "hand" in relation to the direction of rotation of reaction gear 56 is such that, when control sleeve 64 is held against rotation and hence the end of spring 62 at toe end portion 72, the coils of spring 62 contract upon rotation of reaction gear 56 so that the second set of coils grip the peripheral surface of reduced end portion 70 of support member 24. Since support member 24 is fixed by reason of its attachment by bolts 73 to a fixed supporting wall 74, the spring grip on reduced end portion 70 prevents rotation of reaction gear 56. The brake mechanism also includes a control means for selectively controlling rotation of control sleeve 64. The control means includes an arresting means comprising an electrical solenoid 76 and one or a plurality of stop shoulders 78 formed on one end of control sleeve 64 by one or more notches. The solenoid 76 is secured in support member 24 and is so positioned that when its core 80 is extended it engages a shoulder 78 to thus prevent rotation of the control sleeve 64.

The brake mechanism 50 may also be of the wrap-spring type comprising, as shown, a coil spring 82 and a control sleeve 84 which elements are arranged concentrically with brake mechanism 60 within annular bore 48. In brake mechanism 50, coil spring 82 surrounds the outer peripheral surface of control sleeve 84 and is in interference fit with the inner surface of hub portion 41 of reaction gear 40 and out of interference engagement with the surface of bore 48. Similar to spring 62, spring 82 has a radially extending toe portion which extends inwardly into a slot in the end of control sleeve 84 so that the sleeve and spring rotate together upon rotation of reaction gear 40. To arrest rotation of reaction gear 40 a control means is provided which may be similar to the control means for reaction gear 56. The control means may include an arresting means comprising an electrical solenoid 86 and a plurality of stop shoulders 88, similar to stop shoulders 78 of control sleeve 64, formed on the end of control sleeve 84 by one or more slots in the end of the control sleeve. The core 90 of solenoid 86 is actuatable to extend into engagement with shoulder 88 and retract from contact with shoulder 88 and thereby respectively prevent rotation and release for rotation control sleeve 84. Similar to brake mechanism 60, the direction of the coil wrappings or "hand" of spring 82 in relation to the direction of rotation of reaction gear 40, is such that when control sleeve 84 is held against rotation and hence the spring 82 at its toe end portion, the coils of spring 82 expand upon rotation of reaction gear 40 to engage the surface of bore 48 and thereby arrest rotation of reaction gear 40.

In operation of speed reduction transmission mechanism 10, transmission of rotation from input shaft 16 to output shaft 26 is achieved through one or the other of the gear trains depending upon which reaction gear 40 or 56 is held against rotation by actuation of solenoids 76 or 86. Obviously, with both solenoid cores 80 and 90 out of engagement with shoulders 78 and 88 of control sleeves 64 and 84, the speed reduction transmission mechanism 10 is in a neutral condition of operation with no transmission of rotation from input shaft 16 to output shaft 26. Also, with no power to input shaft 16 and solenoids 76 and 86 actuated so that their respecting cores 80 and 90 engage control sleeves 64 and 84, output shaft 26 is locked against rotation. This feature prevents inadvertent output shaft rotation or torque feedback from a load when no rotation is desired.

It is to be understood that while speed changing transmission mechanism 10 of this invention has been described as a speed reducer, the transmission mechanism 10 has application as a speed increaser without departure from the scope and spirit of this invention. To utilize transmission mechanism 10 as herein described, as a speed increaser, the change required is merely to change input shaft 16 to an output shaft and output shaft 26 to an input shaft. In addition, it is to be understood that the invention is not limited to brake mechanisms 50 and 60 shown and herein described, but may be brake mechanisms of the type disclosed in the patents to Parker, U.S. Pat. No. 2,976,976, dated Mar. 28, 1961 and Sajovec, Jr., U.S. Pat. No. 3,185,276, dated Mar. 25, 1965, without departure from the scope and spirit of this invention.

It is believed now readily apparent that the present invention provides a speed changing transmission mechanism which is relatively simple in construction and small in size yet capable of providing speed change ratios of high values.

Although but one embodiment of the invention has been illustrated in detail it is to be expressly understood that the invention is not limited thereto. Various changes can be made in the arrangement of parts without departing from the spirit and scope of the invention as the same will now be understood by those skilled in the art.

What is claimed is:
1. A speed changing transmission comprising:
a. an input member connected to be driven by a source of rotary power;
b. an output member supported for rotation with its axis in substantial alignment with the axis of said input member;
c. output gear means connected for conjoined rotation with said output member;
d. reaction gear means disposed adjacent said input member and held against rotation;
e. a shaft rotatively supported by said input member for rotation about its longitudinal axis;
f. a first planet gear means connected to said shaft for conjoined rotation with the latter;
g. a second planet gear means connected to said shaft for conjoined rotation with the latter, and
h. the longitudinal axis of said shaft extending in non-right angular relationship to the axis of rotation of said input member so that said first planet gear means engages the reaction gear means and the second planet gear means engages the output gear means to rotate the latter at a different speed than the speed of the input member.

2. The apparatus of claim 1 wherein said input member is a shaft supported for rotation about its longitudinal axis in a fixed structure and wherein said reaction gear means is coaxially disposed relative to said input shaft.

3. The apparatus of claim 1 wherein said reaction, output and planet gear means are bevel gears.

4. The apparatus of claim 1 wherein said reaction gear means is supported for rotation and wherein a brake means is provided to selectively hold said reaction gear means against rotation.

5. The apparatus of claim 4 wherein said brake means is a helical spring which coacts with a fixed structure and reaction gear means to prevent rotation of the latter.

6. The apparatus of claim 5 wherein actuating means is provided to effect engagement or disengagement of said brake means.

7. A gear train, two-speed transmission, comprising:
a. an input member connected to be driven by a source of rotary power;
b. an output member supported for rotation with its axis in substantial alignment with the axis of said input member;
c. a first gear train connecting the input and output members for transmitting rotation from the input member to the output member;
d. a second gear train interconnecting the input and output members for transmitting rotation from the input member to the output member;
e. said first and second gear trains each comprise:
e-1. output gear means connected for conjoined rotation with said output member;
e-2. reaction gear means disposed adjacent said input member and held against rotation;
e-3. a shaft rotatively supported by said input member for rotation about its longitudinal axis;
e-4. a first planet gear means connected to said shaft for conjoined rotation with the latter;
e-5. a second planet gear means connected to said shaft for conjoined rotation with the latter;
e-6. the longitudinal axis of said shaft extending in non-right angular relation to the axis of rotation of said input member so that first planet gear means engages the reaction gear means and the second planet gear means engages the output gear means to rotate the latter at a different speed than the speed of the input member;
f. brake means actuatable to selectively prevent rotation of the reaction gear means of said first and second gear trains so that rotation is transmitted to the output member alternately via said first and second gear trains.

8. The apparatus of claim 7 wherein said first and second gear trains comprises bevel gears.

9. The apparatus of claim 7 wherein said brake means comprises for each reaction gear means a normally disengaged coil spring and a control means for effecting engagement of the coil spring and thereby prevent rotation of the associated reaction gear.

10. The apparatus of claim 9 wherein said brake means comprises for each reaction gear means a fixed structure, a hub portion of the reaction gear means and a coil spring wrapped around the fixed structure and hub portion and coacting with the fixed structure and hub portion to connect and disconnect the associated reaction gear means to and from the fixed structure and a control means for causing said coil spring to connect and disconnect the associated reaction gear means and said fixed structure.

11. The apparatus of claim 10 wherein the brake means includes a coil spring for each reaction gear means which coil spring has one portion normally disengaged from a non-rotational structure and a portion normally engaging the associated reaction gear means and wherein a control means is provided to effect engagement of the portion of the coil normally disengaged from the fixed structure.

12. The apparatus of claim 11 wherein the control means includes control sleeves and means for arresting rotation of the control sleeves.

* * * * *